United States Patent
Oishi et al.

(10) Patent No.: US 8,033,845 B2
(45) Date of Patent: Oct. 11, 2011

(54) ROTARY CONNECTOR DEVICE

(75) Inventors: Hiroshi Oishi, Tokyo (JP); Tomohiro Sato, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 36 days.

(21) Appl. No.: 12/457,625

(22) Filed: Jun. 17, 2009

(65) Prior Publication Data

US 2009/0317995 A1    Dec. 24, 2009

(30) Foreign Application Priority Data

Jun. 19, 2008 (JP) ................................ 2008-160649

(51) Int. Cl.
*H01R 3/00* (2006.01)
(52) U.S. Cl. ........................................................ 439/164
(58) Field of Classification Search .................. 439/164, 439/15
See application file for complete search history.

(56) References Cited

U.S. PATENT DOCUMENTS

| | | | | |
|---|---|---|---|---|
| 6,095,836 | A * | 8/2000 | Bolen et al. | 439/164 |
| 6,213,797 | B1 * | 4/2001 | Best et al. | 439/164 |
| 6,302,716 | B1 * | 10/2001 | Matsumoto et al. | 439/164 |
| 6,572,393 | B2 * | 6/2003 | Kawamura | 439/164 |

FOREIGN PATENT DOCUMENTS

JP        11-204224        7/1999

* cited by examiner

*Primary Examiner* — Alexander Gilman
(74) *Attorney, Agent, or Firm* — Rader, Fishman & Grauer PLLC

(57) ABSTRACT

There are provided the body supported to the side of the combination switch and having the circular wall, the rotor connected rotatably to the body and coaxial with the wall section, the free motion spacer formed circularly between the body and the rotor and capable of freely turning with rotation of the rotor, the first guide section and the roller constituting the second guide section which are provided in the free motion spacer, the first flat cable arranged along in the circumferential direction of the outer and inner peripheral sides of the free motion spacer in such a manner that both ends of the first flat cable are fixed to the body and the rotor respectively and the first flat cable is reversed by always making the convex side of the reversing section in the first flat cable contact the first guide section, and the second flat cable arranged along the circumferential direction of the outer and inner peripheral sides of the free motion spacer in such a manner that both ends of the second flat cable are fixed to the body and the rotor respectively and the second flat cable is reversed by always making the concave side of the reversing section of the second flat cable contact the roller.

2 Claims, 3 Drawing Sheets

ROTARY CONNECTOR DEVICE

CROSS-REFERENCE TO RELATED APPLICATION

This application claims priority under 35 USC 119 from Japanese Patent Application No. 2008-160649, the disclosure of which is incorporated by reference herein.

BACKGROUND OF THE INVENTION

1. Field of the Invention

The present invention relates to a rotary connector device supplied for electrical connection between a vehicle body and a steering wheel in an automobile or the like.

2. Description of Related Art

Japanese Patent Laid-Open No. 11-204224 discloses a conventional rotary connector device shown in FIG. 4. This rotary connector device 101 is provided with a fixed-side housing 105 having an outer tubular wall 103 and a movable-side housing 109 having a inner tubular wall 107. A moving body 117 is rotatably arranged in an accommodating section 111 formed between the fixed-side housing 105 and the movable-side housing 109. The moving body 117 is provided with a first opening 113 and a second opening 115. First and second flat cables 119 and 121 are wound in the accommodating section 111 in such a manner that both ends of each of the first and second flat cables 119 and 121 are fixed respectively on circumferential surfaces of the outer tubular wall 103 and inner tubular wall 107 and reversing sections 119a and 121a of the both the flat cables 119 and 121 pass through the first opening 113 and the second opening 115.

When a steering wheel is rotated, this rotation is transmitted to the movable-side housing 109 to rotate the movable-side housing 109 in the same direction. For example, when the movable-side housing 109 rotates in the clockwise direction, the reversing sections 119a and 121a of the first and second flat cables 119 and 121 rotate and move in the clockwise direction by a rotary amount smaller than that of the movable-side housing 109, and the moving body 117 also rotates and moves in the clockwise direction in response to the motion of the reversing sections 119a and 121a. As a result, the first and second flat cables 119 and 121 are reeled out by a length about twice as long as the moving amount from the side of the inner tubular wall 107 and are rewound back to the side of the outer tubular wall 103, so that the first and second flat cables 119 and 121 are in a rewound state. In this case, the reversing section 119a of the first flat cable 119 moves in the first opening 113 in the clockwise direction. At this point the reversing section 121a of the second flat cable 121 moves in the second opening 115 in the clockwise direction, but since a width dimension $W_1$ of the first opening 113 and a width dimension $W_2$ of the second opening 115 are configured to have a relation of $W_1<W_2$, only the reversing section 119a in the first opening 113 having the shorter width dimension presses a fixed tube 123 as a guide section in the clockwise direction, and the reversing section 121a in the second opening 115 having the longer width dimension does not press a fixed tube 125. Therefore, the moving body 117 rotates in the accommodating section 111 by receiving only the pressing force from the reversing section 119a of the first flat cable 119.

In contrast, when the movable-side housing 109 rotates in the counterclockwise direction from a neutral state of the steering wheel, the reversing sections 119a and 121a of the first and second flat cables 119 and 121 rotate and move in the counterclockwise direction by a rotary amount smaller than that of the movable-side housing 109, and the moving body 117 also rotates and moves in the counterclockwise direction in response to the motion of the reversing sections 119a and 121a. As a result, the first and second flat cables 119 and 121 are reeled out by a length about twice as long as the moving amount from the side of the outer tubular wall 103 and are wound up to the side of the inner tubular wall 107, so that the first and second flat cables 119 and 121 are in a wound-up state. In this case also, only the reversing section 119a in the first opening 113 having the shorter width dimension pulls a roller 127 as a guide section opposing the fixed tube 123, and therefore, the moving body 117 rotates in the accommodating section 111 by the tension force.

In this way, in the clockwise direction operation of the steering wheel, the reversing section 119a of the first flat cable 119 moves in the first opening 113 having a width of $W_1$ and thereafter, contacts against the fixed tube 123, and in the counterclockwise direction operation of the steering wheel, the reversing section 119a moves in the first opening 113 having a width of $W_1$ in the opposite direction and thereafter, contacts against the roller 127. Each contact of the reversing section 119a in the first flat cable 119 rotates and moves the moving body 117 in the clockwise direction or in the counterclockwise direction, thus making it possible to smoothly operate the rotary connector device 101.

However, since the rotary connector device 101 is so configured that the reversing section 119a moves in the first opening 113 of $W_1$ and thereafter, contacts against the fixed tube 123 or the roller 127, thus operating the rotary connector device 101, an interference noise of the reversing section 119a with the fixed tube 123 or the roller 127 is possibly generated.

Therefore, in the conventional rotary connector device, when a driver turns a steering wheel of an automobile backward, an impact noise is generated, therefore raising the problem of giving discomfort to the driver as an abnormal sound. That is, the conventional rotary connector device has the problem that since the reversing section moves and thereafter, contacts against the guide section, thereby operating the rotary connector device, the interference noise of the reversing section with the guide section is possibly generated.

In view of the above, there exists a need for a rotary connector device which overcomes the above mentioned problems in the conventional art. The present invention addresses this need in the conventional art as well as other needs, which will become apparent to those skilled in the art from this disclosure.

SUMMARY OF THE INVENTION

The present invention is made in view of the foregoing problem and the present invention has an object of providing a rotary connector device which can restrict or prevent generation of an interference noise.

For restricting or preventing an interference noise at a reversing section of a cable caused by turning a steering wheel backward, a rotary connector device according to an aspect of the present invention comprises:

a fixed-side member supported to a fixed side and having a circular wall section;

a rotary-side member connected rotatably to the fixed-side member and coaxial with the wall section;

a free motion spacer formed circularly between the fixed-side member and the rotary-side member and capable of freely turning with rotation of the rotary-side member;

first and second guide sections provided in the free motion spacer;

a first flexible cable arranged along the circumferential direction of outer and inner peripheral sides of the free motion spacer in such a manner that both ends of the first flexible cable are fixed to the fixed-side member and the rotary-side member respectively and the first flexible cable is reversed by always making a convex side or a concave side of the reversing section of the first flexible cable contact the first guide section; and a second flexible cable arranged along the circumferential direction of outer and inner peripheral sides of the free motion spacer in such a manner that both ends of the second flexible cable are fixed to the fixed-side member and the rotary-side member respectively and the second flexible cable is reversed by always making a concave side or a convex side of the reversing section of the second flexible cable contact the second guide section.

ADVANTAGE OF THE INVENTION

The rotary connector device in the aspect of the present invention can part, for solving the above problem, the reversing section applying a rotational force to the free motion spacer at the first flexible cable and at the second flexible cable depending on the rotational direction.

Therefore, when the rotary-side member rotates in one direction, the reversing sections of the first and second flexible cables which are reeled out from the rotary-side member or wound to the rotary-side member move in the circumferential direction of the free motion spacer, making it possible to quickly a pressing force or a pulling force in the circumferential direction of the free motion spacer to the first or second guide section which is in contact with the convex side or the concave side of the reversing section of the first or second flexible cable.

In addition, when the rotary-side member rotates in the other direction, the reversing sections of the second and first flexible cables which are wound to the rotary-side member or reeled out from the rotary-side member move in the circumferential direction of the free motion spacer, making it possible to quickly a pulling force or a pressing force in the circumferential direction of the free motion spacer to the second or first guide section which is in contact with the concave side or the convex side of the reversing section of the second or first flexible cable.

That is, upon rotation of the rotary-side member in any of the above directions, the reversing sections of the first and second flexible cables are all the time in contact with the first and second guide sections to restrict formation of clearances between the reversing sections of the first and second flexible cables and the first and second guide sections. Therefore, even if a driver turns a steering wheel backward, generation of the interference noise can be restricted or prevented.

That is, an object of the present invention to restrict or prevent an interference noise in the reversing section in the first or second flexible cable is to be realized by all the time making the reversing section of the first or second flexible cable be in contact with the first or second guide section in the free motion spacer.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENTS

Hereinafter, a rotary connector device according to embodiments of the present invention will be explained with reference to the accompanying drawings.

First Embodiment

[Rotary Connector Device]

Figure 1:
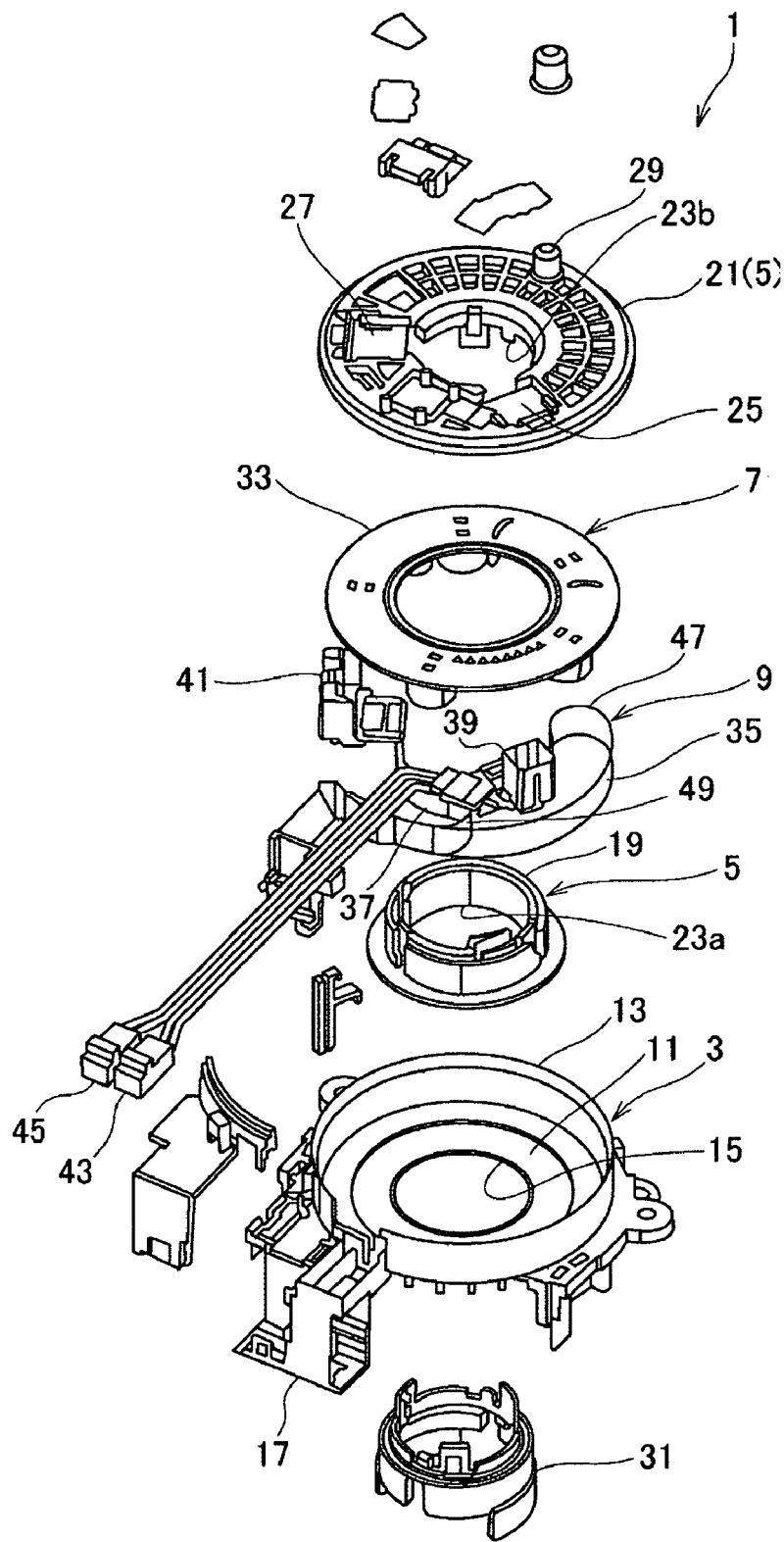
FIG. 1 is an entire exploded perspective view showing an outline of a rotary connector device according to a first embodiment of the present invention.

FIG. 1 is an entire exploded perspective view showing a rotary connector device according a first embodiment of the present invention.

The rotary connector device 1 in FIG. 1 serves to electrically connect a horn, an air bag and the like located in the side of a steering wheel in an automobile to the side of the vehicle body. The rotary connector device 1 is provided with a body 3 as a fixed-side member, a rotor 5 as a rotary-side member, a free motion spacer 7, and a set of flat cables 9.

The body 3 is formed of resin or the like, and is provided with a bottom cover 11 and a circular wall section 13 attached to the bottom cover 11. The bottom cover 11 is fixed to the side of a combination switch attached to a steering column (not shown). The bottom cover 11 is provided with a fixed-side hole section 15 formed at the central portion through which a steering shaft penetrates and a fixed-side terminal support section 17 formed at the side.

The rotor 5 is arranged at the bottom side of the steering wheel and is configured to be capable of rotating with rotation of the steering wheel. The rotor 5 is formed of resin or the like and is provided with a tubular section 19 and a donut-shaped plate section 21 connected to the tubular section 19. The tubular section 19 and the donut-shaped plate section 21 each are provided with rotary-side hole sections 23a and 23b formed at the central sections through which the steering shaft penetrates. The donut-shaped plate section 21 is provided with rotary-side terminal support sections 25 and 27, and a fitting projection 29 formed therein. The fitting projection 29 is fitted to the steering wheel to rotate the rotor 5 with rotation of the steering wheel.

The rotor 5 is rotatably connected through an attachment 31 to the bottom cover 11 of the body 3 and is coaxial with the wall section 13.

The free motion spacer 7 is circularly formed between the wall section 13 of the body 3 and the tubular section 19 of the rotor 5 and is configured to be capable of turning with rotation of the rotor 5. The free motion spacer 7 is formed of resin or the like and is provided with a donut-shaped plate section 33, a roller, and first and second guide sections to be described later.

The set of the flat cables 9 are provided with first and second flat cables 35 and 37 which are first and second flexible cables. The first and second flat cables 35 and 37 respectively are provided with rotary-side terminals 39 and 41 connected at one end, fixed-side terminals 43 and 45 connected at the other end, and reversing sections 47 and 49 at an intermediate portion.

The rotary-side terminals 39 and 41 are supported by the rotary-side terminal support sections 25 and 27 of the donut shaped plate section 21, and the fixed-side terminals 43 and 45 are supported by the fixed-side terminal support section 17 of the body 3.

Figure 2:
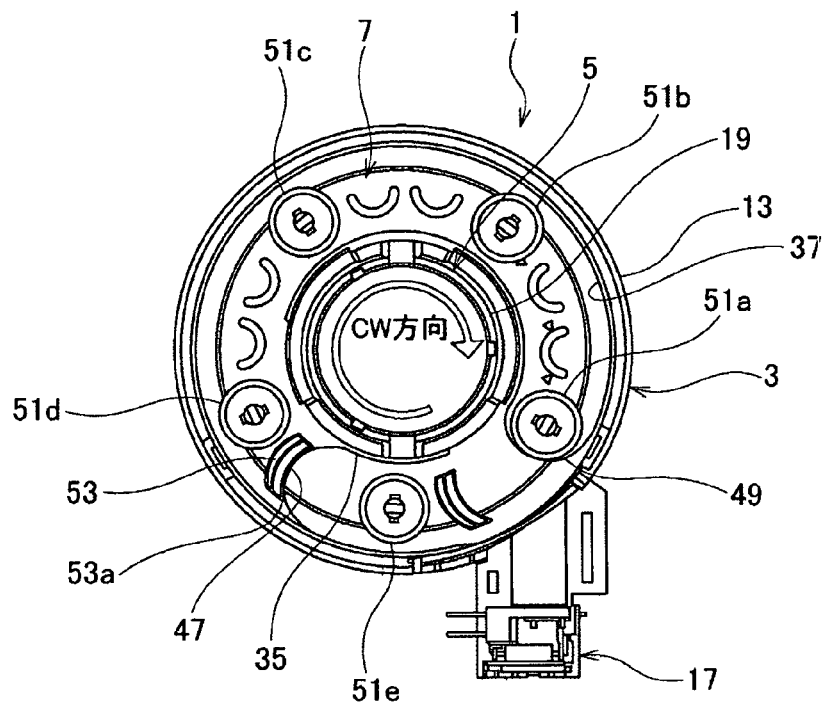
FIG. 2 is a partial bottom view showing a relation between a free motion spacer, first and second guide sections and first and second flat cables as viewed from a body side according to the first embodiment of the present invention.

FIG. 2 is a partial bottom view showing a relation between the free motion spacer, the first and second guide sections and the first and second flat cables as viewed from the body side.

As shown in FIG. 2, the free motion spacer 7 is provided with five rollers 51a, 51b, 51c, 51d, and 51e arranged in the circumferential direction. A first guide section 53 is arranged and fixed close to the roller 51d between the rollers 51d and 51e. The roller 51a constitutes the second guide section.

The first guide section 53 is provided with a guide face 53a bent in a concave shape. The curvature of the guide face 53a corresponds to the curvature of the reversing section 47. The guide face 53a is directed in the circumferential direction of the free motion spacer 7 to be always in contact with a convex side of the reversing section 47 in the first flat cable 35, thud reversing the first flat cable 35. With this reversing, the first flat cable 35 is arranged along the circumferential direction of the outer and inner peripheral sides in a group of the rollers 51a, 51b, 51c, 51d, and 51e of the free motion spacer 7.

The roller 51a as the second guide section is directed in the circumferential direction of the free motion spacer 7 so that a convex-shaped guide face formed of an outer peripheral surface is directed to the concave-shaped guide face 53a. The roller 51a is always in contact with a concave side of the reversing section 49 in the second flat cable 37 to correspond to the curvature thereof, thus reversing the second flat cable 37. With this reversing, the second flat cable 37 is arranged along the circumferential direction of the outer and inner peripheral sides in a group of the rollers 51a, 51b, 51c, 51d, and 51e of the free motion spacer 7.

[Rotational Operation]

When the rotor 5 rotates in one direction, for example, a CW direction in the figure by an operation of the steering wheel, the reversing sections 47 and 49 of the first and second flat cables 35 and 37 reeled out from the rotor 5 move in the CW direction in the circumferential direction of the free motion spacer 7.

At this time, the pressing force in the circumferential direction can be immediately applied to the first guide section 53 which the convex side of the reversing section 47 in the first flat cable 35 is in contact with by the reversing section 47.

Therefore, the free motion spacer 7 moves in association with the reversing section 47 moving in the CW direction sequentially to turn in the same direction between the wall section 13 of the body 3 and the tubular section 19 of the rotor 5.

The reversing section 49 of the second flat cable 37 is guided to rotate by the roller 51a, making it possible to smoothly perform an operation in response to a motion of the reversing section 49. Constant contact of the reversing section 49 at rotating with the roller 51a can prevent a clearance generation between the reversing section 49 and the roller 51a.

When the rotor 5 rotates in the other direction, for example, in the direction opposing the CW direction in the figure by an operation of the steering wheel, the reversing sections 47 and 49 of the first and second flat cables 35 and 37 wound to the rotor 5 move in the direction opposing the CW direction in the circumferential direction of the free motion spacer 7.

At this time, the pulling force in the circumferential direction of the free motion spacer 7 can be immediately applied to the roller 51a which the concave side of the reversing section 49 in the second flat cable 37 is in contact with.

Therefore, the free motion spacer 7 moves in association with the reversing section 49 moving in the direction opposing the CW direction sequentially to turn in the same direction between the wall section 13 of the body 3 and the tubular section 19 of the rotor 5.

At rotating in the direction opposing the CW direction, the curvature of the reversing section 47 in the first flat cable 35 corresponds to the curvature of the guide face 53a in the first guide section 53 and moves in the circumferential direction substantially synchronously, making it possible to smoothly perform the operation in response to the motion of the reversing section 49. Constant contact of the reversing section 47 at rotating with the first guide section 53 can restrict a clearance generation between the first guide section 53 and the reversing section 47.

Advantage of First Embodiment

The rotary connector device 1 according to the aspect of the present invention comprises the body 3 supported to the side of the combination switch and having the circular wall 13, the rotor 5 connected rotatably to the body 3 and coaxial with the wall section 13, the free motion spacer 7 formed circularly between the body 3 and the rotor 5 and capable of freely turning with rotation of the rotor 5, the roller 51a constituting the first guide section 53 and the second guide section provided in the free motion spacer 7, the first flat cable 35 arranged in the circumferential direction of the outer and inner peripheral sides of the free motion spacer 7 in such a manner that both ends of the first flat cable 35 are fixed to the body 3 and the rotor 5 respectively and the first flat cable 35 is reversed by always making the convex side of the reversing section 47 in the first flat cable 35 contact the first guide section 53, and the second flat cable 37 arranged in the circumferential direction of the outer and inner peripheral sides of the free motion spacer 7 in such a manner that both ends of the second flat cable 37 are fixed to the body 3 and the rotor 5 respectively and the second flat cable 37 is reversed by always making the concave side of the reversing section 49 in the second flat cable 37 contact the roller 51a. Therefore, the rotary connector device can part the reversing sections 47 and 49 applying the rotational force to the free motion spacer 7 between the first flat cable 35 and the second flat cable 37 depending on the rotational direction.

Therefore, when the rotor 5 rotates in the CW direction in response to the steering of the steering wheel, the reversing sections 47 and 49 of the first and second flat cables 35 and 37 which are reeled out from the rotor 5 move in the circumferential direction of the free motion spacer 7, making it possible to quickly apply the pressing force in the circumferential direction to the first guide section 53 which is in contact with the convex side of the reversing section 47 of the first flat cable 35.

In addition, when the rotor 5 rotates in the direction opposing the CW direction in response to the steering in the opposite direction of the steering wheel, the reversing sections 47 and 49 of the first and second flat cables 35 and 37 which are wound to the rotor 5 move in the circumferential direction of the free motion spacer 7, making it possible to quickly apply the pulling force in the circumferential direction of the free motion spacer 7 to the roller 51a which is in contact with the concave side of the reversing section 49 of the second flat cable 37.

That is, upon rotation of the rotor 5 in any of the above directions, the reversing sections 47 and 49 of the first and second flat cables 35 and 37 are all the time in contact with the first guide section 53 and the roller 51a, and a formation of the clearance between the reversing sections 47 and 49 and the first guide section 53 and the roller 51a is restricted and prevented. Therefore, even if a driver turns a steering wheel backward, generation of the interference noise can be restricted or prevented.

In the first guide section 53, the concave-shaped guide face 53a is configured to be always in contact with the convex side of the reversing section 47 in the first flat cable 35, thus reversing the first flat cable 35 and is directed in the circumferential direction of the free motion spacer 7. The roller 51a has the convex-shaped guide face which is configured to be always in contact with the concave side of the reversing section 49 in the second flat cable 37 to reverse the second flat cable 37 and is directed in the circumferential direction of the free motion spacer 7 to be directed to the concave-shaped guide face 53a.

Therefore, at the time of rotation of the roller 5 in the CW direction, the reversing section 49 of the second flat cable 37 is guided to rotate by the roller 51a, making it possible to smoothly perform an operation in response to the motion of the reversing section 47. In addition, it is possible to restrict or prevent a clearance generation between the reversing section 49 and the roller 51a as described above.

At the time of rotation of the roller 5 in the direction opposing the CW direction, the reversing section 47 of the first flat cable 35 moves substantially synchronously with the guide face 53a of the first guide section 53, making it possible to smoothly perform an operation in response to the motion of the reversing section 49. In addition, it is possible to restrict or prevent a clearance generation between the first guide section 53 and the reversing section 47 as described above.

Second Embodiment

Figure 3:
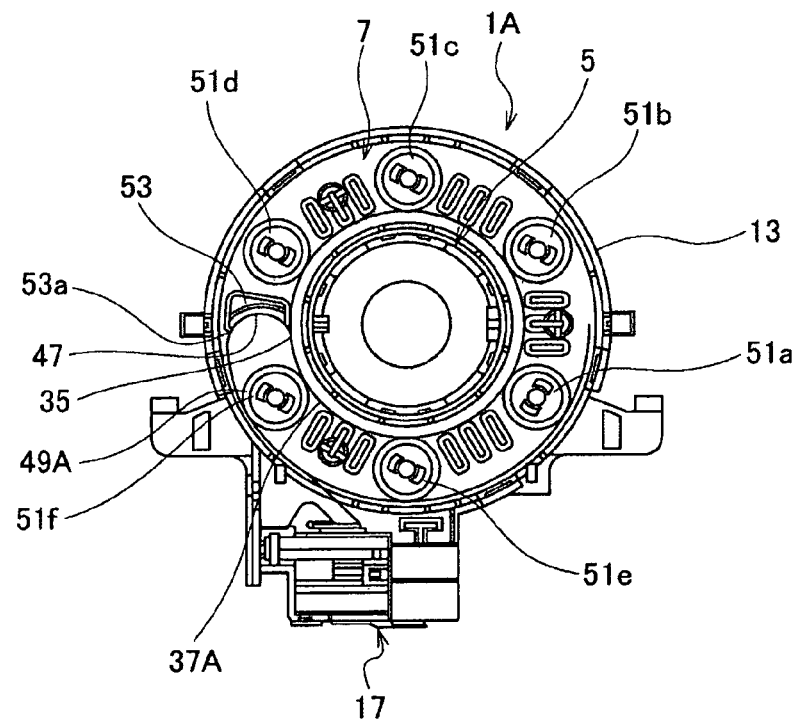
FIG. 3 is a partial bottom view showing a relation between a free motion spacer, first and second guide sections and first and second flat cables as viewed from a body side according to a second embodiment of the present invention.
Figure 4:
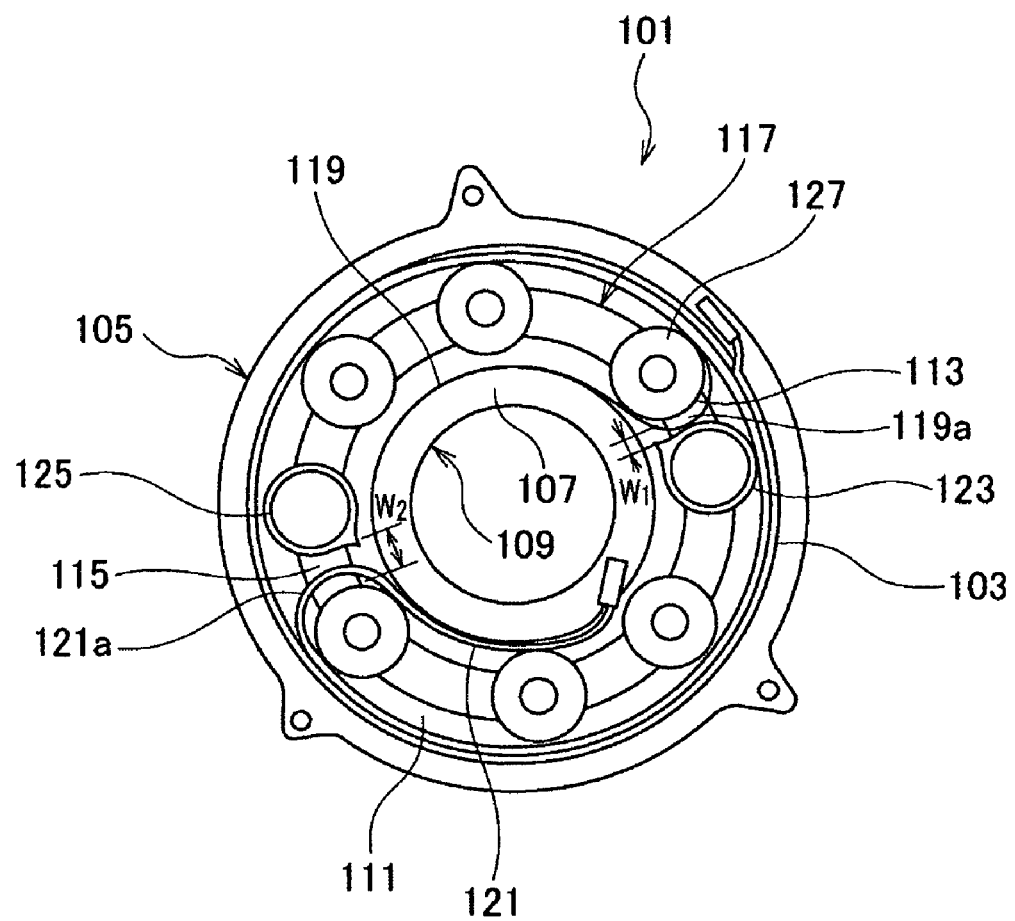
FIG. 4 is a partial bottom view showing a relation between a free motion spacer, a guide section and first and second flat cables as viewed from a body side according to the conventional rotary connector device.

FIG. 3 relates to a second embodiment of the present invention and is a partial bottom view showing a relation between the free motion spacer, the first and second guide sections and the first and second flat cables as viewed from the body side. It should be noted that the basic construction in the second embodiment is similar to that in the first embodiment, and components which are the same as or identical to those in the first embodiment are referred to as the same codes or the same codes +A. The explanation thereof is omitted.

As shown in FIG. 3, in a rotary connector device 1A of the present embodiment, a roller 51f adjacent to the first guide section 53 is added to form the second guide section.

Therefore, also in the present embodiment, upon rotation in the clockwise direction, the first guide section 53 receives a pressing force from the reversing section 47 of the first flat cable 35, and upon rotation in the counterclockwise direction, the roller 51f as the second guide section can receive a pulling force from a reversing section 49A of a second flat cable 37A.

Accordingly, also in the present embodiment, the reversing sections 47 and 49A applying a rotational force to the free motion spacer 7 can be parted between the first and second flat cables 35 and 37A. The first guide section 53 is always in contact with the reversing section 47 of the first flat cable 35, and the roller 51f as the second guide section is always in contact with the reversing section 49A of the second flat cable 37A. Therefore, the present embodiment can achieve the effect similar to that in the first embodiment.

Others

The first guide section may be formed of any one of the rollers 51a, 51b, 51c, 51d, 51e and 51f, and the second guide section may be provided to be fixed.

The first and second guide sections both may be constructed of the fixed guide section or a rotating roller.

The fixed guide section may be formed of a fixed cylinder.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A rotary connector device comprising:
   a fixed-side member supported to a fixed side and having a circular wall section;
   a rotary-side member connected rotatably to the fixed-side member and coaxial with the wall section;
   a free motion spacer formed circularly between the fixed-side member and the rotary-side member and capable of freely turning with rotation of the rotary-side member;
   first and second guide sections provided in the free motion spacer;
   a first flexible cable arranged along the circumferential direction of outer and inner peripheral sides of the free motion spacer in such a manner that respective ends of the first flexible cable are fixed to respective ones of the fixed-side member and the rotary-side member, the first flexible cable being reversed to define a first flexible cable reversing section having a convex side being in continuous contact with the first guide section; and
   a second flexible cable arranged along the circumferential direction of outer and inner peripheral sides of the free motion spacer in such a manner that respective ends of the second flexible cable are fixed to respective ones of the fixed-side member and the rotary-side member, the second flexible cable being reversed to define a second flexible cable reversing section having a concave side being in continuous contact the second guide section.

2. A rotary connector device according to claim 1, wherein:
   the first guide section includes a concave-shaped guide face in continuous contact with the convex side of the first flexible cable reversing section to reverse the first flexible cable, the guide face being directed in the circumferential direction of the free motion spacer; and
   the second guide section includes a convex-shaped guide face in continuous contact with the concave side of the second flexible cable reversing section to reverse the second flexible cable, the guide face being directed in the circumferential direction of the free motion spacer to be directed to the concave-shaped guide face.

* * * * *